United States Patent [19]

Dorst et al.

[11] Patent Number: 5,046,183
[45] Date of Patent: Sep. 3, 1991

[54] SEMI-AUTOMATED OPERATOR ASSISTANCE TELECOMMUNICATION CALLS

[75] Inventors: Gary L. Dorst, Brookfield; Francis J. Pope, III, Naperville, both of Ill.

[73] Assignee: AT&T Bell Laboratories, Murray Hill, N.J.

[21] Appl. No.: 388,188

[22] Filed: Jul. 31, 1989

[51] Int. Cl.$^5$ .......................................... H04M 15/00
[52] U.S. Cl. ................................. 370/110.1; 379/96; 379/144
[58] Field of Search ............................ 370/58.1, 110.1; 379/96, 112, 122, 130, 131, 132, 136, 140, 144, 396

[56] References Cited

U.S. PATENT DOCUMENTS

| | | | |
|---|---|---|---|
| 3,364,313 | 1/1968 | Scheinman | 179/27 |
| 3,484,560 | 12/1969 | Jaeger, Jr. et al. | 179/27 |
| 4,656,624 | 4/1987 | Collins et al. | 370/60 |
| 4,797,910 | 1/1989 | Daudelin | 379/67 |
| 4,899,375 | 2/1990 | Bauer et al. | 379/264 |
| 4,935,956 | 6/1990 | Hellwarth et al. | 379/144 |

*Primary Examiner*—Douglas W. Olms
*Assistant Examiner*—Melvin Marcelo
*Attorney, Agent, or Firm*—W. Ulrich

[57] ABSTRACT

An operator assistance call handling arrangement is disclosed featuring the use of an intelligent telecommunications station (intelligent phone) for the collection and transmission of call data to an operator assistance system for setting up a call without the intervention of an operator. The intelligent phone is equipped to handle CCITT (International Consulative Committee for Telephone and Telegraph) standard Layer 3 (Q.931) call control messages defined for message associated user-to-user information (MA-UUI). The operator assistance system is part of a central telephone office switching system, and is connected to the intelligent phone via an integrated services digital network (ISDN) basic rate interface (BRI). For station-to-station (station) collect calls, person-to-person (person) calls including collect and calling card calls, and bill-to-third party calls, a calling (back) party enters information identifying the class of charge (COC) and other call data at the intelligent phone, which formats the information into a user-to-user information element (UUIE). The intelligent phone then places the UUIE comprising the call information into a Q.931 SETUP message and sends the SETUP message over a ISDN D-channel to the switching system system comprising the operator assistance system to set up an ISDN B-channel call between the back party and a called (forward) party. By utilizing the COC information, connections for collect, person and bill-to-third party calls are set up without the intervention of an operator. Later, when the operator assistance system seizes an operator position to service the call after the call has been answered by the forward party, the call data is automatically displayed for the operator.

19 Claims, 8 Drawing Sheets

SEMI-AUTOMATED OPERATOR ASSISTANCE TELECOMMUNICATION CALLS

CROSS REFERENCE TO RELATED APPLICATIONS

This application is related to the application Ser. No. 388,189, entitled "Time and Charges Information Delivery For Operator Assistance Telecommunication Calls", filed July 31, 1989, concurrently with, and assigned to the same assignee as this application.

TECHNICAL FIELD

This invention relates to the processing of operator assistance telecommunications calls.

PROBLEM

In the present mode for operating the public telephone network, toll and assistance operators are still required for a large class of these calls. For example, toll and assistance operators are required for processing calls such as station-to-station (station) collect calls; person-to-person (person) calls including sent paid, collect, and calling card calls; and bill-to-third party calls.

Customer-dialed operator assistance calls are usually referred to as zero plus (0+) calls because the customers dial zero (signifying an operator assistance type call) plus a directory number. Operator calls that have no customer-dialed directory number are usually referred to as zero minus (0— or 00—) calls because customers do not dial further after having dialed one or two zeroes to get the intervention of an operator. A major expense in setting up operator assistance calls is the cost of the time of the operators whose services are required. In the past, the cost for setting up 0+ and 0— calls has been sharply reduced through the introduction of systems such as the Traffic Services Position System (TSPS) No. 1, and the Operator Services Position System (OSPS), both manufactured by AT&T Network Systems, which require that operators only be connected to a call during the call setup time and that operators may be recalled when needed for such operations as collecting an overtime charge on a coin call, notifying a customer of the elapsed time and charges for a call, or in response to an originating customer flash because of, for example, poor transmission or a poor connection. All of these conditions are detected by timing or in response to calling customer signals.

Even with these systems, for calls such as person and collect calls, there remains a substantial amount of recoverable time during which an operator must attend the call but is not actively servicing the call. This interval, for example, occurs from the time that a customer on a person sent paid call has given the identity of the telephone number and individual to whom he or she wants to talk and the time that the called telephone is answered. Arrangements to eliminate such intervals require that operators be readily disconnected and reconnected to calls.

Later arrangements reduce operator work time for collect calls and person-to-person calls (which include person-collect, person-paid, person calling card and person bill to third number). An example of such an arrangement is the more efficient call handling (MECH) process, described in a pending application of T. M. Bauer et al., Ser. No. 248,459, wherein a first operator is connected to the call after the completion of customer dialing and, for a class of calls, this operator is disconnected from the call after determining the class of charge (COC) including the billing method and any required billing data; subsequently, a second operator who may or may not be the same as the first operator is connected to the call in response to the answer signal of the called customer. Such an arrangement reduces the operator work time on the call by making it unnecessary for an operator to be connected to the call during the call setup time and ringing interval and if the call is not answered, the second operator is not required at all.

In the MECH arrangement, the first operator may record the name of the calling party for a collect call, the name of the called party on a person call, and both names for a person collect call. Subsequently, when the second operator is attached to the call, the COC and previously entered name is displayed at the operator position of the second operator. Thus the second operator is ready to talk to the called party immediately upon being connected to the call without first having to ascertain from the calling party, the calling party's name or the name of the requested called party in a person call. Further, such an arrangement eliminates the need for the second operator to warn the called party that this is an operator assistance call and that the operator needs to ascertain information before talking further to the called party.

Although the MECH arrangement reduces operator work time on calls, there is a need to further reduce the amount of operator work time required to process the handling of such operator assistance calls, such as person, collect and bill to third party calls.

SOLUTION

The above problem is solved and an advance is made in the art in accordance with a new method and apparatus of our invention featuring the use of an exemplary intelligent telecommunications station (intelligent phone) for collecting and transmitting call data to an operator assistance for initiating the setting up a call without the intervention of an operator. For collect, person, and bill to third party calls, a calling (back) party enters information identifying the class of charge (COC) into the intelligent phone. The phone then sends the call identification information to an operator assistance system as part of a signaling message to set up the call. By utilizing the COC information, connections for collect, person and bill to third party calls are set up without the intervention of an operator. Later, when the operator assistance system seizes an operator position to service the call after the call has been answered by the called or forward party, the call data is automatically displayed for the operator. Advantageously, neither an operator nor telephone network resources are required to gather COC information, thus significantly reducing operator work time and network resource usage.

In the exemplary embodiment CCITT (International Consulative Committee for Telephone and Telegraph) standard Layer 3 (Q.931) call control messages defined for message associated user-to-user information (MA-UUI) carry user-to-user information elements (UUIEs) to a MECH program process for collect, person-to-person, and bill to third party calls. A back party places a call by entering COC information (such as person or station call, collect or bill to third party call and the called party name and number) into an enhanced user interface payphone, which sends the information to the MECH process as a MA-UUI element of a Q.931 SETUP message. The MECH process sets-up the call to the forward party based on the information received in the UUIE. The MECH process waits until a called party answers the call and then activates a mechanism to seize an operator position, with the call information displayed at the position. Advantageously, an operator is not required to gather call information, thus, operator work time is significantly reduced.

In accordance with one aspect of the exemplary embodiment, the intelligent phone, an enhanced user interface payphone, interacts with a back party to gather call information by asking the back party questions via a display screen. The enhanced user interface payphone performs error checking on the information entered by the back party. The payphone is equipped to use MA-UUI signaling, and is connected to a central office telephone switching system via an integrated services digital network (ISDN) basic rate interface (BRI), thus providing an integrated voice and data communication facility. A network connection is established only after information required to initiated a call is verified. The enhanced user interface payphone then places the information in the UUIE of a Q.931 SETUP message and sends it to the MECH process. Advantageously, the enhanced user interface phone eliminates the need to use network facilities prior to receipt of verified call information.

DETAILED DESCRIPTION

Figure 1:
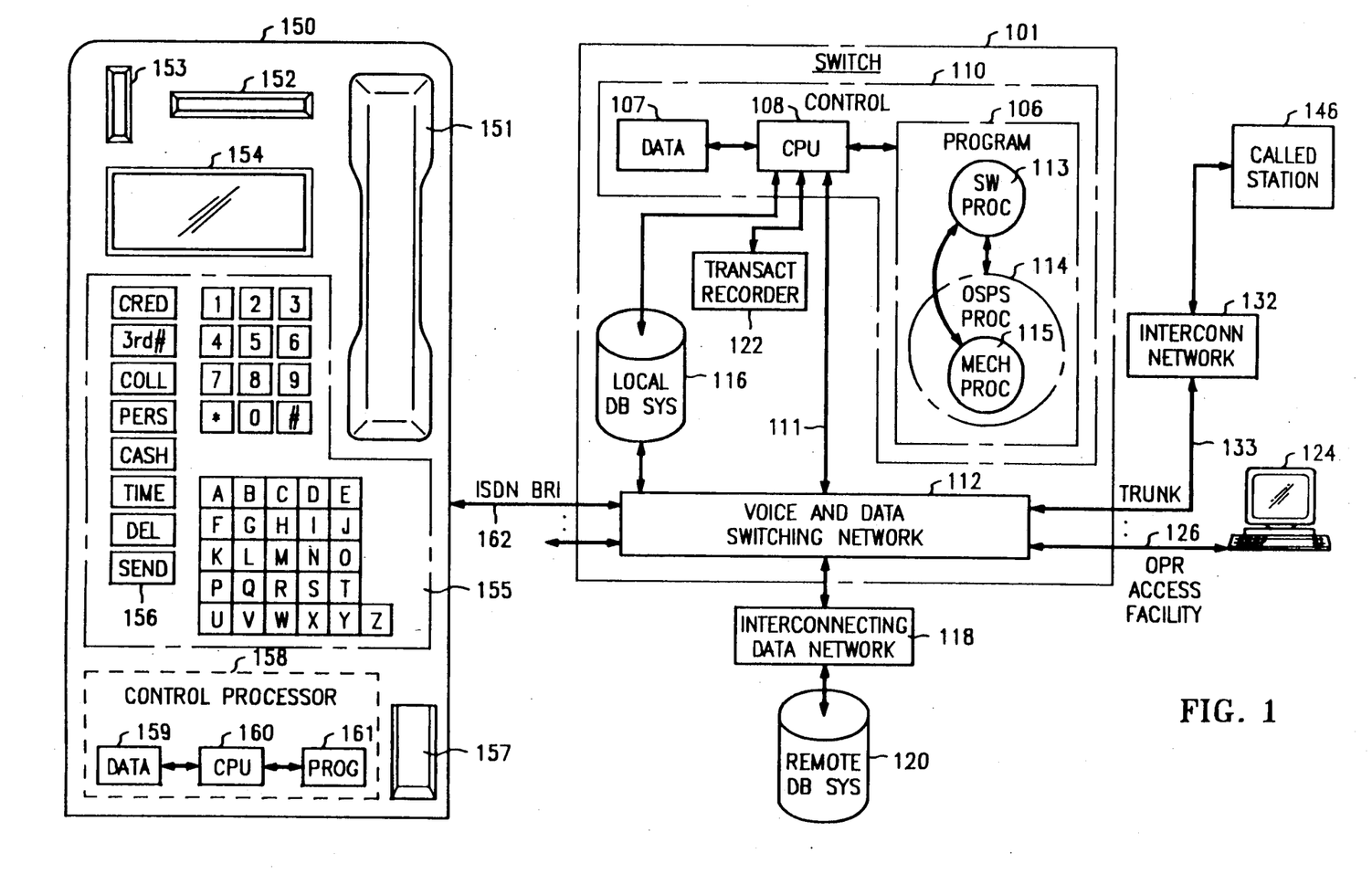
FIG. 1 is a block diagram of an operator assistance switching system for processing operator assistance calls in accordance with the methods of FIGS. 2-8.

FIG. 1 is an architectural diagram of a system illustrating one embodiment of the present invention. The system comprises an "enhanced" public telephone 150, comprising a handset 151, a credit card reader 152, a coin slot 153, a display screen 154, a keyboard 155, a coin return slot 157, and a control processor 158, comprising a data store 159, a central processing unit (CPU) 160, and a program 161 for controlling the operations of the CPU 160. The public phone is equipped with an International Consultative Committee for Telephone and Telegraph (CCITT) Integrated Services Digital Network (ISDN) Basic Rate Interface (BRI), as described in CCITT Red Book Fascicle III.5 Series 1 Recommendation, and has the capability of handling standard Q.931 interface, as described in CCITT Red Book Fascicle VI.9 Recommendation Q.931. The public phone 150 uses CCITT standard message associated user-to-user information (MA-UUI) signaling, and is connected to a switching system 101 via an ISDN BRI 162.

The switching system (switch) 101 is a 5ESS® switch, extensively described in *AT&T Technical Journal*, vol. 64, no. 6, part 2, pp. 1305-1564, July/August 1985, which also serves as an Operator Services Position System (OSPS) as described in N. X. DeLessio et al.: "An Integrated Operator Services Capability for the 5ESS Switching System", *International Switching Symposium '84*, (Florence), Session 22C, Paper 3, pp. 1-5, May 1984. The change required in the switching system to implement the present invention is the addition of a program in the control 110 of the switch for executing the tasks described in the flow charts of FIGS. 4-7. The switch 101 comprises a control 110 for controlling the switch. The control 110, in turn, comprises a central processing unit 108, a program 106 for controlling the operations of the central processing unit, and a data store 107 for storing call data. The program 106 comprises switching processes 113 to handle the switching of calls, an operator services position system (OSPS) process 114 to handle operator assistance calls, and the more efficient call handling (MECH) process 115 to more efficiently handle operator assistance calls. The switch also comprises a local data base system 116 for storing data such as: (1) customer lines connected to the system, such as the Q.931 equipped customer line 162, (2) interconnecting networks 132, (3) trunks, such as trunk 133 connected to the system, and (4) data about operator positions connected to the system, A transaction recorder 122 is used for recording billing data. The switch also comprises a voice and data switching network 112 which can be used for transmitting data among control unit 110 interconnecting data network 118 and operator access facility 126, and for transmitting voice among trunks coming into the system, such as trunk 133 to interconnecting network 132, customer lines such as customer line 162 and operator access facilities such as operator access facility 126. The interconnecting network 132 which may include one or more switching systems is used for accessing the called customer station 146 from switch 101. Operator position 124, connected to the voice and data switching network 112 by operator access facility 126, comprises a video terminal for displaying data obtained from control 110, local data base system 116, and remote data base system 120. While a typical system would have many operator positions attached, for clarity, only one is shown herein. Remote data base system 120 is connected to voice and data switching network 112 via interconnecting data network 118. Voice and data switching network 112 is connected to control unit 110 via a control connection 111. Interconnecting data network 118 and remote data base system 120 are used for obtaining data about the calling or called terminal and/or called station when this data is not available in the local data base system 116.

In this specific embodiment of the present invention, a calling (back) party makes a call from the public telephone 150 by entering call information on the keyboard 155, responsive to a request from a menu on the display screen 154. The back party completes the calling procedure by pressing the send button 157 on the keyboard 155. The enhanced public phone 150 then formats the call information into a user-to-user information element (UUIE) of a Q.931 SETUP message, places the UUIE into a SETUP message, and sends the message to the voice and data switching network 112 of the switching system 101, which routes the call to the OSPS process 114. The OSPS process 114 opens the UUIE to validate the call information and handle any error conditions, and sends the information to the MECH process 115. The MECH process 115 uses the information provided in the UUIE to set up a connection to a called (forward) party station 146. Once a connection to the forward party station 146 is set up via trunk 133 and interconnecting network 132 to forward party station 146, and an answer from the forward party station 146 is detected in the voice and data switching network 112 and relayed via control connection 111 to control 110, control 110 then informs the MECH process 115 and causes a connection to be set up. The MECH process 115 alerts the OSPS process 114 that an operator should be queued, and an operator position is connected to the call. The connection is among the back party station 150, the forward party station 146 and an operator position, similar to operator position 124, connected via its own operator access facility, similar to operator access facility 126. Data describing the call is then displayed on the operator's terminal to permit the operator to further control the call by signaling requests for changes in the call configuration to the control 110.

Figure 2:
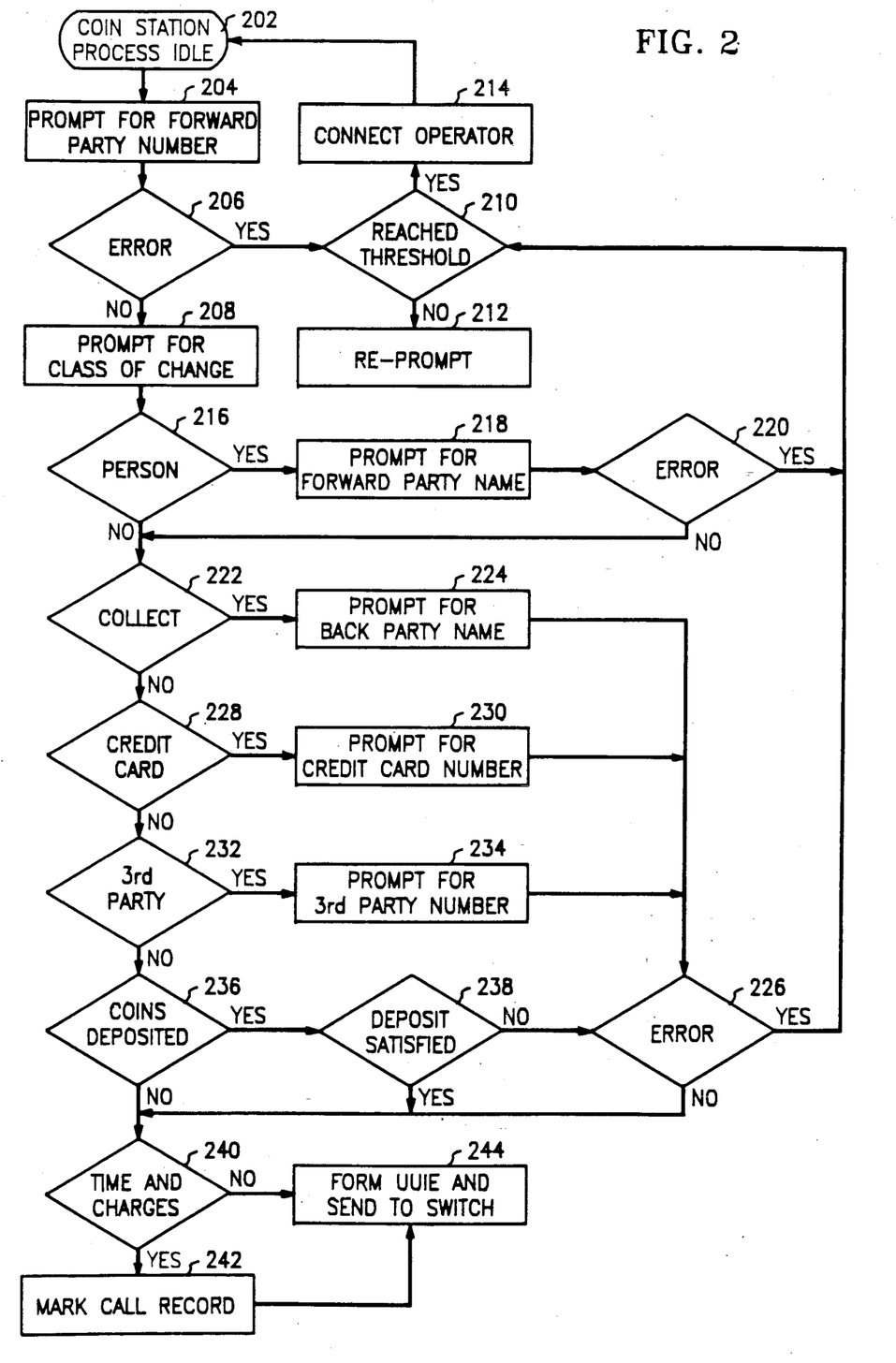
FIGS. 2-8 are data layouts and flow diagrams of methods of processing operator assistance calls in accordance with the invention.

FIG. 2 is a flow diagram of an enhanced public phone program process (coin station process) which handles the collection and sending of call information. The process which is controlled within the public telephone 150 is inactive while the coin station is idle (block 202). The process begins when a back party enters a forward party number on the keyboard of the phone (action block 204). The process then checks for errors in the forward party number (test 206). If there are errors, an error handling procedure is invoked which does the following: (1) the procedure determines whether the back party has been re-prompted to enter the information a maximum number of times (test 210); (2) if threshold has not been reached, the process re-prompts the back party for the information (action block 212); however, if the threshold has been reached, the back party is connected to an operator (action block 214) and the process returns to its idle state (block 202). Otherwise, if no error occurred in entering the forward party number, the process checks for the class of charge (COC) entered by the back party (action block 208). If the call is a person call (test 216), the enhanced phone process then waits to receive the forward party name (action block 218); if the call is collect (test 222), the process waits to receive the back party name (action block 224); if the call is a credit call charge call (test 228), the process waits for a credit card number (action block 230); finally, if the call is a third party call (test 232), the process waits to receive the third party number to be billed (action block 234). If any errors occur in the tests or reception of any data (test 220 and test 226), the call is handled by the procedure described above.

After the COC is entered, the process then waits to receive any coins that need to be deposited (action block 236), and checks whether the required coin deposit, if any, is satisfied (test 238). If the deposit is not satisfied, the error treatment procedure, described above, is invoked; otherwise, the process next checks whether the back party wants to be informed of time and charges information after the call (test 240). If so, the call record is marked, i.e., a special octet is formed to indicate that time and charges information are requested (action block 242). Finally, the process uses the information provided by the back party together with a self generated unique coin station identifier (used for verification of proper time and charges information delivery) to form a UUIE (of a Q.931 SETUP message) to be sent to the MECH process in the switching system (action block 244), and the coin station returns to idle (block 202).

Figure 3:
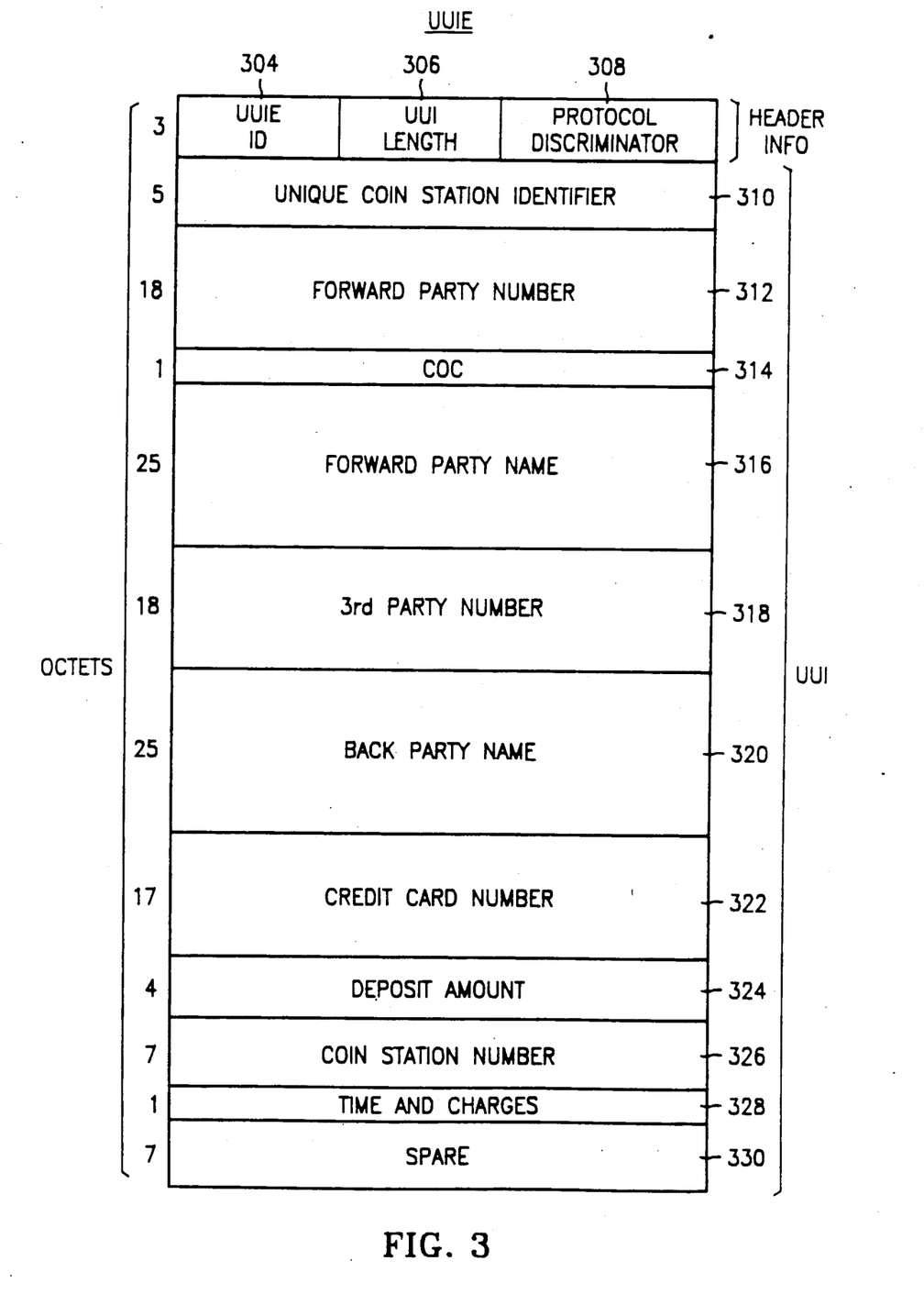

The Q.931 protocol limits the maximum length of the UUIE of a SETUP message to 131 octets, 128 of which may contain UUI and the remainder used for a message header. FIG. 3 is a diagram illustrating the structure of the UUIE in the present invention. The 3 octets of the message header contain call control information (CCI), comprising a UUIE ID 304, the length of the UUI 306, and a protocol discriminator 308. The specific embodiment of the present inveniton uses 121 of the possible 128 octets remaining for UUI. The UUI contains a unique coin station identifier 310, which identifies the call, a forward party number 312, the COC 314, the forward party name 316, a third party name 318, a back party name 320, a credit card number 322, a deposit amount 324, a coin station number 326, and one octet to signify a request for time and charges information 328. The remaining possible seven octets 330 are unused.

FIGS. 4-7 are flow diagrams of the method of one embodiment of the present invention, starting at the point after the Q.931 SETUP message has been sent by the back party station. These figures depict the operation of an operator assistance process, comprising the OSPS process 114, and the MECH process 115. Calls that are treated in accordance with the principles of this invention are called modified MECH calls Other calls are given treatment by "standard practices" signifying treatment in accordance with the normal practices for operator assistance calls of this type as described, for example, in the *Bell System Technical Journal*, (B.S.T.J.), vol. 58, no. 6, part 1, July/August 1979, and B.S.T.J., vol. 49, no. 10, December 1970, pp. 2417-2709, especially pp. 2625-2683.

Figure 4:
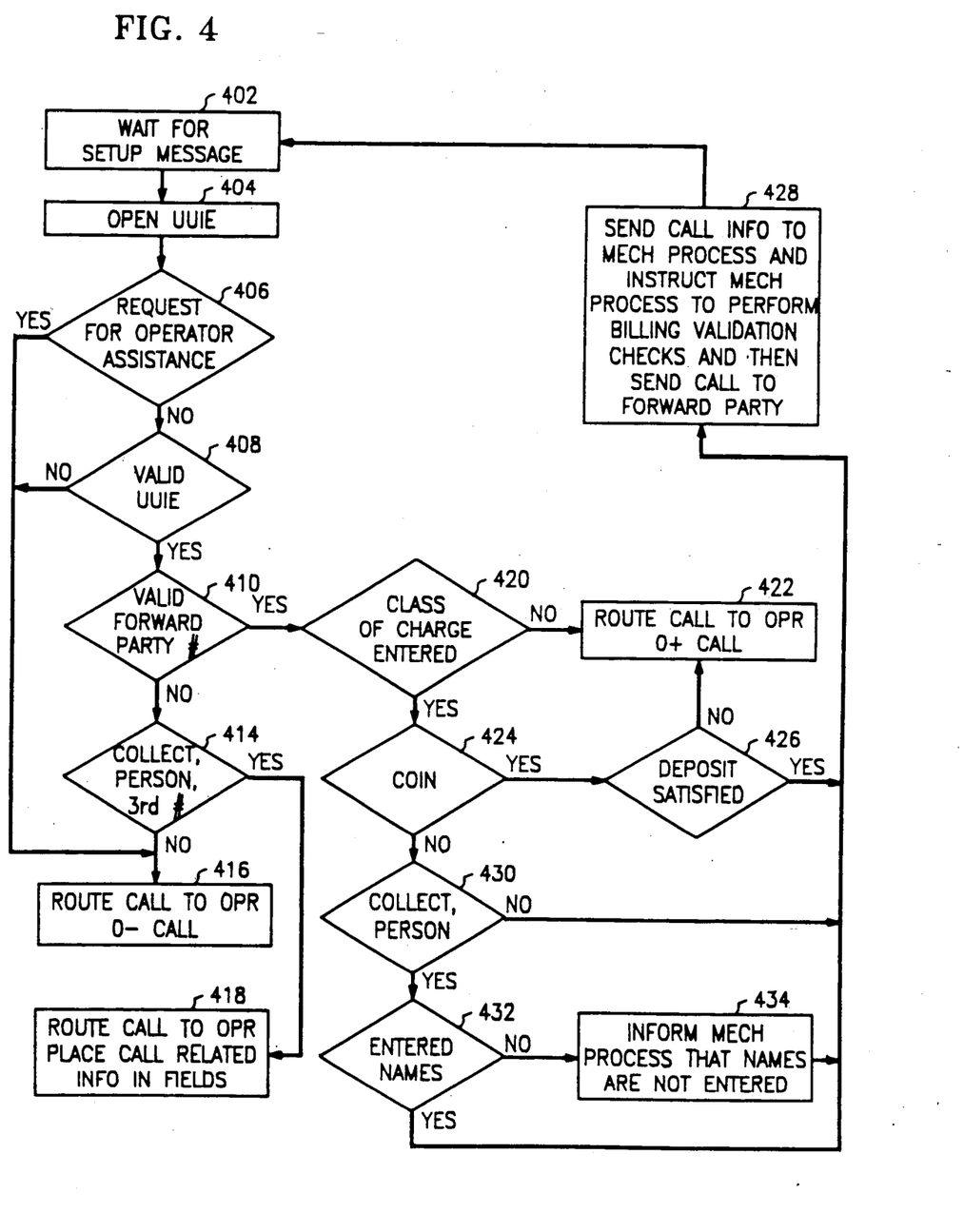

The process waits for a SETUP message to arrive at the switching system (action block 402), opening the UUIE of a message once it arrives (action block 404). It next checks for a customer for a customer request for operator (OPR) assistance (test 406), routing the call to an operator (treating call as 0−) if an OPR assistance signal is discovered (action block 416). Otherwise, the process checks whether the UUIE is valid under the protocol (test 408). If the UUIE is valid, the process then checks whether the UUIE contains a valid forward party number (action block 410), otherwise, the call is treated as a 0− call and routed to an operator (action block 416).

If the forward party number contained in the UUIE is invalid, the call is treated as a 0− call (action block 416). If the number is valid, then the call is a 0+ call; if not, the call must be sent to an operator in accordance with 0− call handling procedures, and the process then checks if the call is collect, person-to-person, or bill to third party call (test 414). The process places related call information for these types of calls into fields to be used by the operator (action block 418).

For the call is a 0+ call, the process next checks whether the class of charge for the call has been entered (test 420). If not, the call is routed to an operator (action block 422), otherwise the process next checks whether the call is a coin deposit call (test 424); if so, the process checks if the deposit has been satisfied (test 426). It routes the call to an operator if the deposit is unsatisfied (action block 422), otherwise, it sends the information contained in the UUIE to the modified MECH process, and instructs the modified MECH process to perform billing validation checks for the call and then sends the call to the forward party (action block 428).

Billing validation checks are performed in conformance with standard practices to see if the calling customer is entitled to place this type of call to the called station. For example, a collect call to a coin phone is not usually allowed. For the case of a person call that is to be billed to a third party, this includes verifying whether the third party accepts such billing or wishes to be called, and, if necessary, calling that third party to verify acceptance of the billing. The modified MECH process sends a call to a forward party by outpulsing the call to the telephone central office connected to the forward party. The back party is left to monitor the progress of the call. This "outpulsing" can be done over talking trunks or via separate common channel signaling facilities. It is the back party who detects busy or no answer and initiates a disconnect for those cases. The operator assistance system monitors the connection to detect the return of answer supervision.

If the call is not a coin, the process checks the COC to determine whether the call is collect or person-to-person (test 430); if not, the call information for the call is sent to the modified MECH process, along with instructions to perform billing validation checks and send the call to the forward party (action block 428). Finally, if the call is a collect or person-to-person call, the process checks the UUIE to determine whether the required names have been entered (test 432); if not, the process informs the modified MECH process that the names have not been entered (action block 434), and performs the standard instruction procedures (action block 428). If the names have been entered, the standard instruction procedures are performed (action block 428). Subsequent actions are described with respect to the flow chart FIG. 5 starting with test 502.

Figure 5:
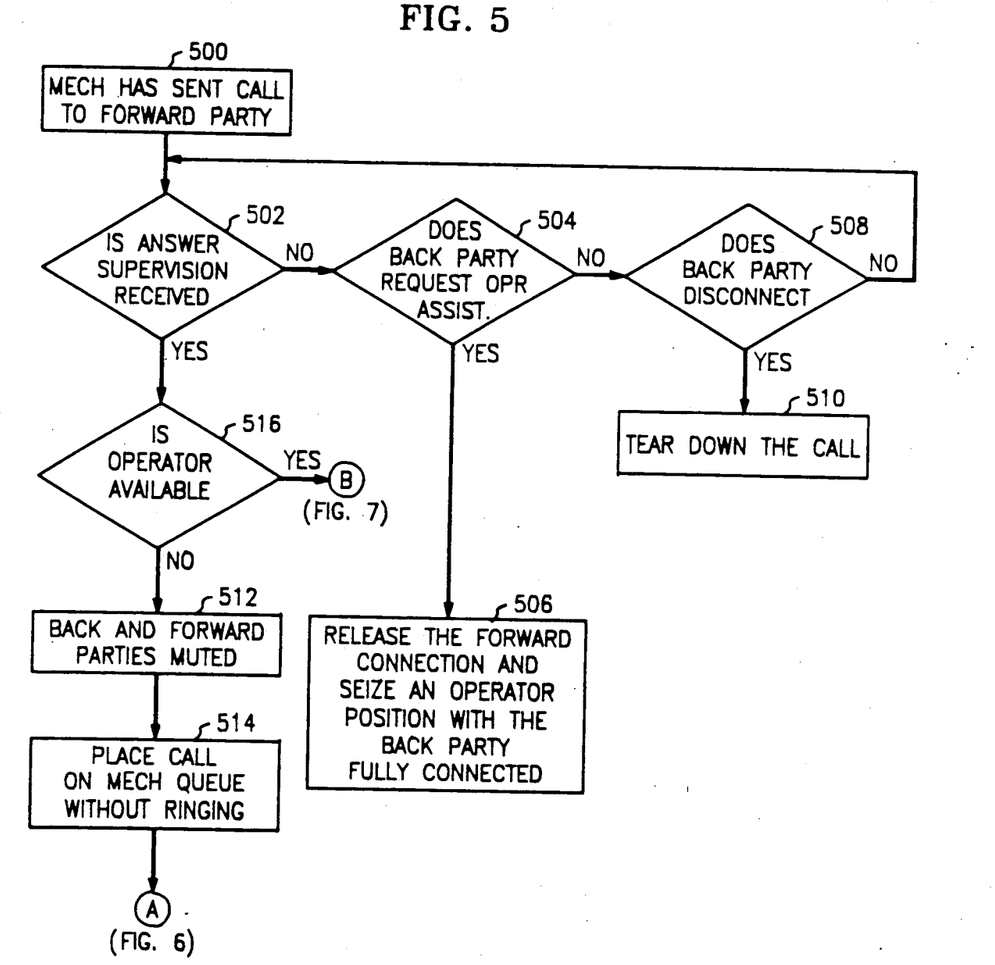

FIG. 5 describes the process of detecting an answer from the forward party and the actions performed immediately thereafter. Test 502 checks whether answer supervision is received, i.e., whether the forward party answers. If not, test 504 is performed to test whether the back party has requested OPR assistance. If the back party has requested OPR assistance, then the forward connection, i.e., the connection to the forward party is released and an operator position is connected to the back party to receive further instructions (action block 506). The back party and operator are fully connected to allow the calling customer to talk to and hear the operator at the operator position where the call history is displayed to the operator. If the back party does not request OPR assistance, a test is made to check whether the back party disconnects (test 508). If the back party disconnects, the call is torn down (action block 510). This action would be performed if the back party decides that the forward party is not answering or if the back party hears busy or overflow tone. If the back party does not disconnect, supervisory monitoring of the call for answer is resumed (test 502, previously discussed). If answer supervision is received as detected in test 502 and an OPR is available (test 516), then actions are performed in accordance with FIG. 7. If an OPR position is not available, the connection is arranged so that both the back and the forward parties are muted (action block 512), i.e., that neither calling nor called party can hear the other. The call is then placed on a high priority queue for an operator position without giving audible tone to either the back or the forward party in order to avoid confusion (action block 514). There may be several such queues in an operator assistance system, for queuing different types of modified MECH calls. Next, the actions described in FIG. 6 are performed starting with test 602.

Figure 6:
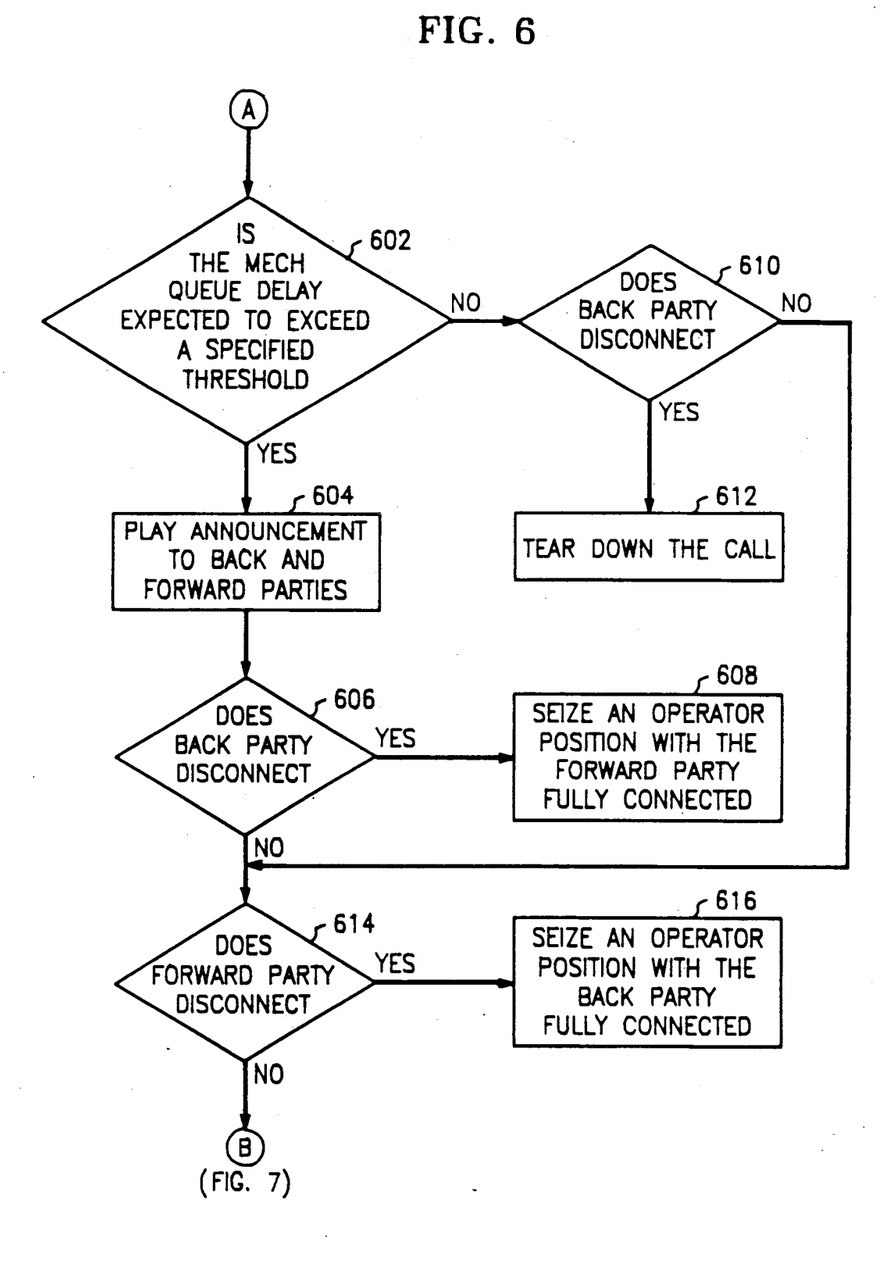

FIG. 6 describes the actions performed until an operator position can be connected to the call. Test 602 determines whether the MECH queue (i.e., the queue in which the call was entered in action block 514) is expected to introduce a delay that exceeds a specified threshold. If so, an announcement is played to both the back and the forward parties (action block 604). The announcement might say: "Please hold, an operator will be connected promptly." If the back party disconnects, as determined by test 606, then an operator position is seized (action block 608) so that the operator may talk to the forward party to explain what happened. The operator position and the forward party are fully connected to allow them to talk to each other.

If the back party disconnects before an announcement is played, as determined by test 610, then the call is torn down (action block 612). If the back party does not disconnect, with or without the announcement, then a test is made to see whether the forward party has disconnected (test 614). If so, an operator position is seized and a connection is set up with the back party (action block 616). The back party and the operator are fully connected. Requests for OPR assistance by the back party are ignored, if received, prior to a forward party disconnect or prior to the actions to be discussed below with respect to FIG. 7, starting with action block 702, because the call is already on a high priority queue for an operator.

Figure 7:
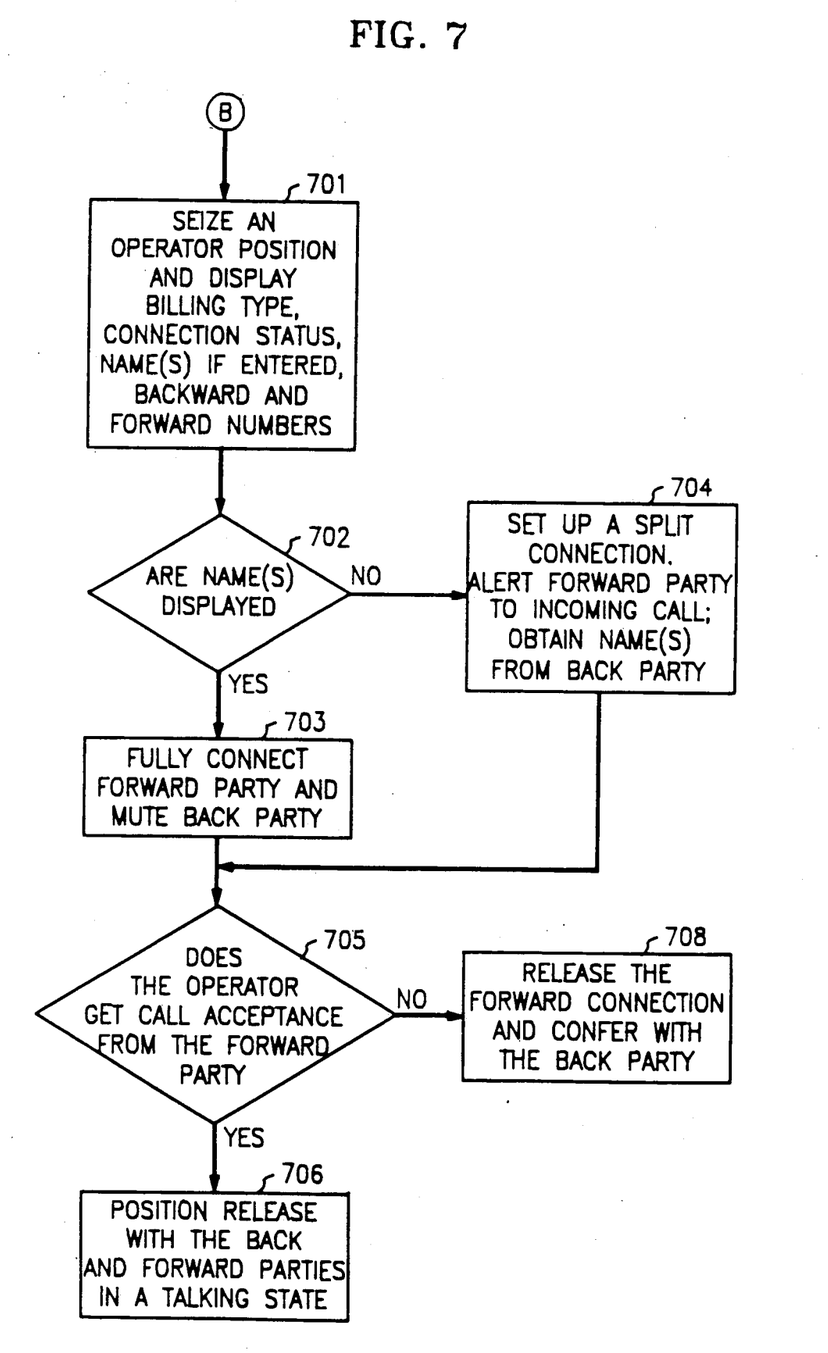

FIG. 7 describes the actions performed by the operator for a modified MECH call in the present invention. The operator position is seized, and the billing type, the connection status, and the forward and backward numbers, i.e., the called and calling numbers, are displayed (action block 701). If the appropriate names have been entered by the back party while placing the call, these are also displayed. Test 702 checks whether these names are displayed. If so, the operator signals for a connection wherein the called party is fully connected and the calling party is muted to prevent unauthorized transmission of a message from the calling party (action block 703). If not, the operator signals to set up a split connection, the called party is alerted by the operator that there is an incoming call, and the calling party is queried to obtain the appropriate name(s) (action block 704). This is the information needed by the operator to find out if a called party is willing to accept charges for a collect call, or to find out if the appropriate individual has answered a person-to-person call, and, if not, to ask for that appropriate individual. In either case, the operator seeks to get an acceptance of the call from the called party. If the operator is satisfied that the conditions for setting up the call have been met (positive output of test 705), then the operator position signals to be released from the call and the calling and called parties are connected in a full talking state (action block 706). If the operator fails to get an acceptance of the call (negative output of test 705), then the operator signals to release the forward connection (the connection to the called party) and confers further with the calling party via a full talking state connection (action block 708).

Figure 8:
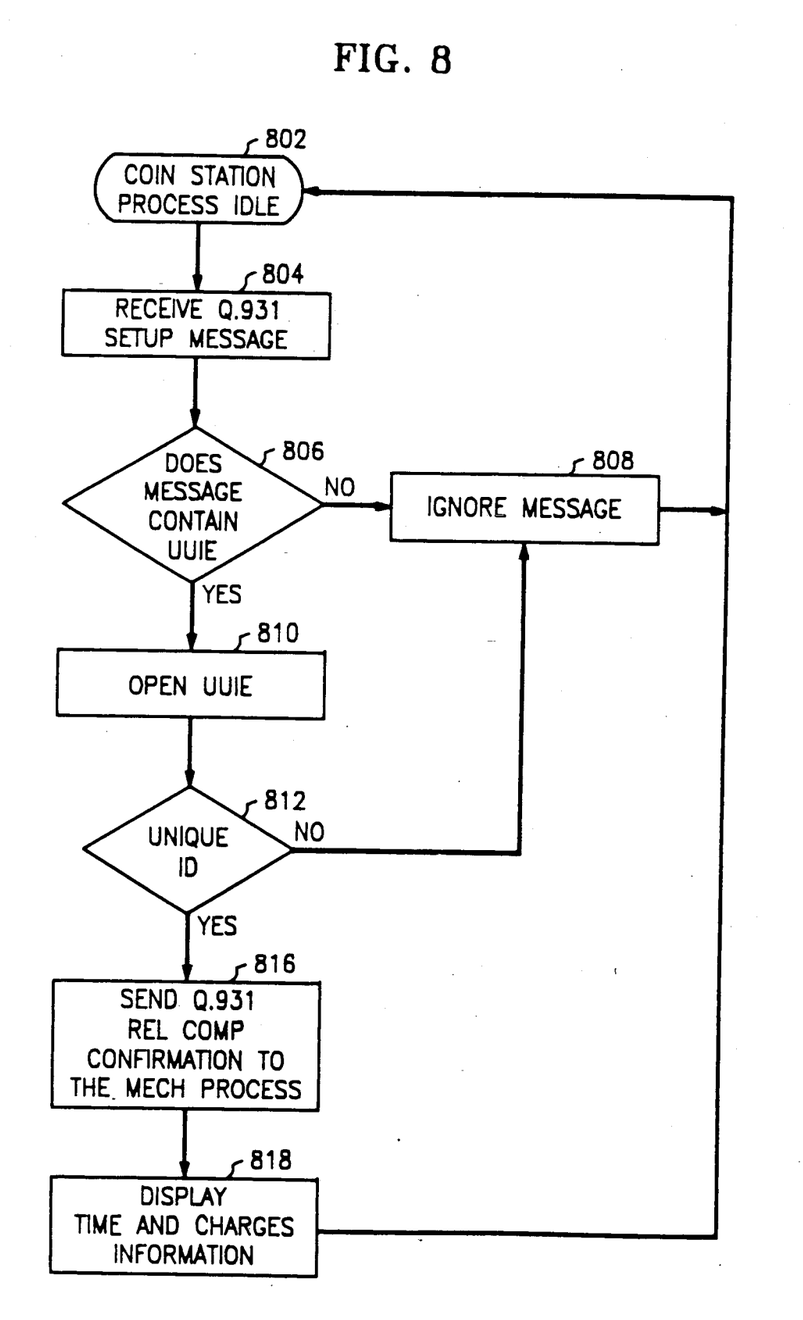

FIG. 8 is flow diagram of the actions taken by the coin station process when a back party requests time and charges information. The coin station process is idle (block 802) until a Q.931 SETUP message is received from a switching system (action block 804). The process checks whether the SETUP message contains a UUIE (test 806). If it does not, the process ignores the SETUP message without displaying any information (action block 808). Otherwise, the process "opens" the UUIE (action block 810) and verifies if the UUIE has a unique coin station identifier (UCSI) (310 in FIG. 3), that matches the UCSI generated for the last outgoing call (test 812). This UCSI verifies that the information in the UUIE is associated with the back party. If the UCSI does not match (test 812), the process ignores the SETUP message without displaying any information (action block 808). If, on the other hand, if the UCSI matches that generated for the last outgoing call, the process sends a Q.931 REL COMP confirmation message to the modified MECH process (action block 816) to terminate the call and displays the time and charges information on the display screen of the phone (action block 818). The coin station process then returns to idle (block 802).

Although the present invention is described using the principles of ISDN, other communication facilities could be used. For example, the sending of call data from the station to the operator assistance system could be accomplished using analog data transmission over a conventional analog line during the initial call request period.

It is to be understood that the above-described procedures are merely illustrative of the principles of the invention and many variations may be devised by those skilled in the art without departing from the spirit and scope of the invention.

We claim:

1. A method of setting up an operator assistance call from a back party station to a forward party station, comprising the steps of:
   collecting call information at the back party station, the information comprising operator assistance class of charge (COC) data for the back party station;
   sending a call setup data message, comprising the collected call information from the back party station to an operator assistance system, said operator assistance system for setting up connections among a plurality of lines, trunks and operator positions connected thereto; and
   responsive to a receipt of the setup message, processing said call setup data message in the system, for extending a connection from the back party toward the forward party if the COC is one of a predetermined class of charge types.

2. The method of claim 1 wherein the predetermined class of charge types includes person-to-person calls.

3. The method of claim 1 wherein the predetermined class of charge types includes collect calls.

4. The method of claim 1 wherein the predetermined class of charge types includes bill to third party calls.

5. The method of claim 1 wherein the sending step further comprises:
   checking the validity of the call information;
   if the checking step indicates valid call information, forming a user information data block from the call information; and
   placing the user information data block in the call setup message.

6. The method of claim 1 wherein the station is connected to the system via an integrated services digital network (ISDN) basic rate interface (BRI), and wherein the sending step comprises:
   the station sending the call setup message to the system over a D-channel of the BRI.

7. The method of claim 1 wherein the extending step comprises:
   responsive to the receipt of the call setup message by the operator assistance system, sending the call information to an operator assistance program process of a control processor of the system for controlling the extension of the connection.

8. The method of claim 1 wherein said call setup message comprises data for a credit card number.

9. A method of setting up an operator assistance call from a back party station to a forward party station, comprising the steps of:
   collecting call information at the back party station, the information comprising operator assistance class of charge (COC) data for the back party station;
   sending a call setup message, comprising the collected call information from the back party station; and
   responsive to a receipt of the setup message in the system, extending a connection from the back party toward the forward party if the COC is one of a predetermined class of charge types;
   wherein the extending step comprises extending the connection without setting up a connection to an operator position, and further comprising:
   responsive to the receipt of an answer signal from the forward party, an operator assistance program process of a control processor of the operator assistance system controlling a set up of a connection between a communications link extending toward the forward party and an operator position, and displaying the call information at the operator position.

10. A method of setting up an operator assistance call from a back party station to a forward party station, comprising the steps of:
    collecting call information at the back party station, the information comprising operator assistance class of charge (COC) data for the back party station;
    sending a call setup message, comprising the collected call information from the back party station to an operator assistance system; and
    responsive to a receipt of the setup message in the system, extending a connection from the back party toward the forward party if the COC is one of a predetermined class of charge types;
    wherein the extending step comprises:
    by-passing a connection to an operator position prior to extending the connection toward the forward party.

11. The method of claim 10 wherein the predetermined class of charge types includes person-to-person calls.

12. The method of claim 10 wherein the predetermined class of charge types includes collect calls.

13. The method of claim 10 wherein predetermined the class of charge types includes bill-to-third party calls.

14. A method of setting up an operator assistance call from a back party station to a forward party station, wherein the back party station comprises an intelligent phone, and wherein the forward party station and the back party station are connectable to an operator assistance system, comprising the steps of:
    the intelligent phone prompting a back party for input;
    responsive to input from the back party, the intelligent phone collecting call information, comprising operator assistance class of charge (COC) data;
    the intelligent phone checking the validity of the call information;

the intelligent phone forming a user information data block from the call information if the call information is valid;

the intelligent phone placing the user information data block in a call setup message;

the intelligent phone sending the call setup message to the operator assistance system;

responsive to the receipt of the call setup message by the operator assistance system, sending the call information to an operator assistance program process of a control processor of the operator assistance system for controlling the extension of a call;

the operator assistance program process determining that the COC is one of a class of call types that are handled by the operator assistance process, the class including person-to-person calls, collect calls and bill to third party calls, without connection of an operator position;

in the operator assistance system, by-passing a connection to an operator position prior to extending a connection toward the forward party;

extending a connection from the back party toward the forward party, without setting up a connection to an operator position; and responsive to the receipt of an answer signal from the forward party, the operator assistance program process controlling the setting up of a connection between the forward party and an operator position and displaying the call information at the operator position.

15. A method of setting up an operator assistance call from a back party station to a forward party station, wherein the back party station comprises an intelligent phone, wherein the forward party station and the back party station are connectable to an operator assistance system, wherein the intelligent phone is equipped to handle CCITT (International Consultative Committee for Telephone and Telegraph) standard Layer 3 (Q.931) call control messages defined for message associated user-to-user information (MA-UUI), and wherein the back party station is connected to the system via an integrated services digital network (ISDN) basic rate interface (BRI), comprising the steps of:

the intelligent phone prompting a back party for input;

responsive to input from the back party, the intelligent phone collecting call information, comprising operator assistance class of charge (COC) data;

the intelligent phone checking the validity of the call information;

the intelligent phone forming a user-to-user information element (UUIE) comprising the call information, if the call information is valid;

the intelligent phone placing the UUIE in a Q.931 SETUP message;

the intelligent phone sending the SETUP message to the operator assistance system over a D-channel of the BRI;

responsive to the receipt of the SETUP message by the operator assistance system, sending the UUIE comprising the call information to an operator assistance program process of a control processor of the operator assistance system for controlling the extension of a call;

the operator assistance program process determining that the COC contained in the call information is one of a class of call types that are handled by the operator assistance process, the class including person-to-person calls, collect calls and bill to third party calls, without connection of an operator position;

in the operator assistance system, by-passing a connection to an operator position prior to extending a connection toward the forward party;

extending a connection from the back party toward the forward party, without setting up a connection to an operator position; and responsive to the receipt of an answer signal from the forward party, the operator assistance program process controlling the setting up of a connection between the forward party and an operator position and displaying the call information at the operator position.

16. Apparatus for signaling an operator assistance call request from a back party to a forward party comprising:

a switching network, connectable to the back party, a trunk or line extendable to the forward party, and an operator position; and control means, operable under the control of the operator assistance process, for controlling the following operations:

responsive to receipt of a call information data message comprising class of charge (COC) information from the back party, if the COC is one of a predetermined class of charge types, extending a connection from the back party through the network towards the forward party via a trunk or line without connecting an operator position; and responsive to receipt of an answer signal from the forward party, setting up a connection in the network between the operator position and the forward party and displaying the call information at an operator position.

17. The apparatus of claim 16 wherein the switching network communicates with the back party via an integrated services digital network (ISDN) basic rate interface (BRI), the switching network further comprising:

means for passing CCITT (International Consultative Committee for Telephone and Telegraph) standard Layer 3 (Q.931) call control messages defined for message associated user-to-user information (MA-UUI) from the back party to the control means.

18. Telecommunications station apparatus for requesting the setting up of an operator assistance call from a back party through an operator assistance system comprising:

means for collecting class of charge (COC) information from the back party;

means for forming a data message comprising the COC information; and means for sending the data message toward an operator assistance system for handling of the call;

wherein the forming means comprises:

means for forming CCITT (International Consultative Committee for Telephone and Telegraph) standard Layer 3 (Q.931) call control messages defined for message associated user-to-user information (MA-UUI); and the sending means comprises:

means for sending the data message to the operator assistance system over a D-channel of an integrated services digital network (ISDN) basic rate interface (BRI).

19. Telecommunications station apparatus for requesting the setting up of an operator assistance call from a back party through an operator assistance system comprising:
- means for collecting class of charge (COC) information from the back party;
- means for forming a data message comprising the COC information; and
- means for sending the data message toward an operator assistance system for handling of the call, said operator assistance system comprising means responsive to the receipt of an answer signal from a forward party for controlling a setup of a connection between an communications link extending toward the forward party and an operator position connected to said operator assistance system and for displaying the call information of said data message at the operator position.

* * * * *